United States Patent
Rokhsaz et al.

(10) Patent No.: US 10,079,825 B2
(45) Date of Patent: Sep. 18, 2018

(54) METHOD AND APPARATUS FOR AUTHENTICATING RFID TAGS

(75) Inventors: Shahriar Rokhsaz, Austin, TX (US); Edwin de Angel, Austin, TX (US)

(73) Assignee: RFMICRON, INC., Austin, TX (US)

( * ) Notice: Subject to any disclaimer, the term of this patent is extended or adjusted under 35 U.S.C. 154(b) by 948 days.

(21) Appl. No.: 12/845,654

(22) Filed: Jul. 28, 2010

(65) Prior Publication Data

US 2011/0025458 A1 Feb. 3, 2011

Related U.S. Application Data

(60) Provisional application No. 61/273,227, filed on Aug. 1, 2009.

(51) Int. Cl.
| | |
|---|---|
| *H04L 9/00* | (2006.01) |
| *G05B 19/00* | (2006.01) |
| *H04L 29/06* | (2006.01) |
| *G06Q 20/38* | (2012.01) |

(52) U.S. Cl.
CPC ....... *H04L 63/0853* (2013.01); *G06Q 20/382* (2013.01); *G06Q 20/388* (2013.01); *G06Q 20/3827* (2013.01); *G05B 2219/31304* (2013.01); *H04L 63/0492* (2013.01); *Y02P 90/10* (2015.11)

(58) Field of Classification Search
CPC ..... H04W 4/008; H04W 12/06; H04W 12/08; H04W 4/02; H04W 4/021; H04W 4/028; H04W 8/10; H04W 12/02; H04W 12/04; H04W 48/14; H04W 48/16; H04W 4/025; H04W 4/04; H04W 4/12; H04W 4/14; H04W 4/18

USPC ..... 235/375; 340/10.1, 10.4, 5.52, 5.61, 5.7; 380/268, 270; 713/190

See application file for complete search history.

(56) References Cited

U.S. PATENT DOCUMENTS

| | | | | |
|---|---|---|---|---|
| 7,643,637 | B2 * | 1/2010 | Venkatesan | H04L 1/0057 375/245 |
| 8,049,594 | B1 * | 11/2011 | Baranowski | 340/5.61 |
| 8,154,405 | B2 * | 4/2012 | Gravelle | G06F 21/606 235/492 |
| 8,335,930 | B2 * | 12/2012 | Johnson et al. | 713/190 |
| 2006/0071778 | A1 * | 4/2006 | Vesikivi | G06F 17/30876 340/539.1 |

(Continued)

OTHER PUBLICATIONS

The Promising but Plodding RFID Industry, Stanford Group Company, Apr. 1, 2008.

(Continued)

*Primary Examiner* — Yong Hang Jiang (74) *Attorney, Agent, or Firm* — Garlick & Markison; Timothy W. Markison (57) ABSTRACT

In an RFID system, a method and apparatus for linking an RFID tag to an associated object. The system includes a relatively simple tag, a reader, a linker, and a store. The reader interrogates the tag for an ID and selectively provides the ID to the linker. The linker, in turn, uses the ID to provide back to the reader an associated Uniform Resource Identifier ("URI"). The reader then forwards the URI to the store. In response, the store returns to the reader the object associated with the ID via the URI. The disclosed method and apparatus provide more efficient and secure tag authentication.

9 Claims, 7 Drawing Sheets

(56) References Cited

U.S. PATENT DOCUMENTS

| | | | |
|---|---|---|---|
| 2006/0293085 A1* | 12/2006 | Lauper | H04M 17/00 |
| | | | 455/558 |
| 2008/0179390 A1* | 7/2008 | Harjani | 235/375 |
| 2011/0025473 A1* | 2/2011 | Rokhsaz et al. | 340/10.4 |
| 2011/0234371 A1* | 9/2011 | Linton et al. | 340/5.7 |
| 2012/0300933 A1* | 11/2012 | Baranowski | 380/270 |
| 2012/0306616 A1* | 12/2012 | Griffin | 340/5.52 |
| 2012/0313757 A1* | 12/2012 | Volpi et al. | 340/10.1 |
| 2012/0319823 A1* | 12/2012 | Butler et al. | 340/10.1 |

OTHER PUBLICATIONS

"Nonlinear Dynamics of Chaotic Double-Loop Sigma Delta Modulation," Orla Freely, in 1994 IEEE International Symposium on Circuits and Systems, pp. 101-104.

"RFID Handbook: Applications, Technology, Security, and Privacy." Ahson, et al, CRC Press, Boca Raton, FL, USA, 2008, p. 490.

* cited by examiner

METHOD AND APPARATUS FOR AUTHENTICATING RFID TAGS

CROSS-REFERENCE TO RELATED APPLICATIONS

This application claims priority to the U.S. Provisional Patent Application Ser. No. 61/273,227 ("Parent Provisional"), filed 1 Aug. 2009. The foregoing Parent Provisional is hereby incorporated by reference in its entirety as if fully set forth herein. The subject matter of this application is related to U.S. application Ser. No. 12/845,644 ("Related Application"), filed simultaneously herewith. The foregoing Related Application is hereby incorporated by reference in its entirety as if fully set forth herein.

BACKGROUND OF THE INVENTION

1. Field of the Invention

Our invention relates generally to radio-frequency identification ("RFID") systems and, in particular, to a method and apparatus for linking an RFID tag to an associated object while addressing issues of privacy and authentication.

2. Description of the Related Art

In general, in the descriptions that follow, we will italicize the first occurrence of each special term of art which should be familiar to those skilled in the art of radio frequency ("RF") communication systems. In addition, when we first introduce a term that we believe to be new or that we will use in a context that we believe to be new, we will bold the term and provide the definition that we intend to apply to that term. In addition, throughout this description, we will sometimes use the terms assert and negate when referring to the rendering of a signal, signal flag, status bit, or similar apparatus into its logically true or logically false state, respectively, and the term toggle to indicate the logical inversion of a signal from one logical state to the other. Alternatively, we may refer to the mutually exclusive boolean states as logic_0 and logic_1. Of course, as is well know, consistent system operation can be obtained by reversing the logic sense of all such signals, such that signals described herein as logically true become logically false and vice versa. Furthermore, it is of no relevance in such systems which specific voltage levels are selected to represent each of the logic states.

Figure 1:
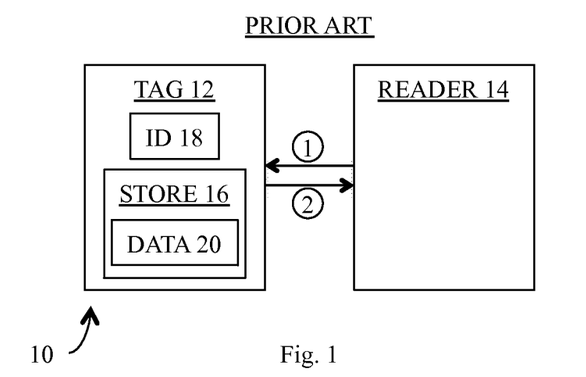
FIG. 1 illustrates in block diagram form, a prior art RFID system, including a tag and a reader.

As is known, a radio frequency identification ("RFID") system may include multiple tags and at least one reader. Shown in FIG. 1 is prior art RFID system 10 which includes a single, exemplary tag 12 and a reader 14. Tag 12, at a minimum, includes an integrated circuit (not shown) for storing and processing information, and an antenna circuit (not shown) for exchanging data with reader 14. At a minimum, the integrated circuit of tag 12 implements a unique identifier ("ID") 18 and control logic (not shown) adapted to facilitate the operation of tag 12 in RFID system 10. Depending on the manufacturing technology selected to implement tag 12, ID 18 may be implemented using any of the known types of persistent memory, such as read-only memory ("ROM"), programmable ROM ("PROM"), ultraviolet erasable PROM ("UV-PROM"), electrically-erasable PROM ("EE-PROM"), fast EE-PROM ("FLASH"), or the like. As may be desired, ID 18 may be as simple as a unique binary bit string or as complex as an Electronic Product Code ("EPC") as specified, e.g., by the EPCglobal Tag Data Standards (currently at Version 1.4) and as used in many passive UHF RFID applications. As is known, the nature of ID 18 will be system specific and will, in general, be determined by a host system adapted to manage the RFID system 10.

In the illustrated form, the integrated circuit of tag 12 further includes a store 16 adapted to store a system-specific data object, hereinafter referred to as data object 20. Depending on the application, store 16 may be implemented using any of the known types of persistent memory, which may or may not be the same type as selected to implement the ID 18. Data object 20 may include such information as the name of the manufacturer, product details, pricing information, and the like. As is known, the nature of data object 20 will be system specific and will, in general, be determined by the host system.

During normal operation, reader 14 interrogates tag 12 [illustrated in FIG. 1 as transaction 1], and receives ID 18 and data object 20 from tag 12 [transaction 2]. Depending on the application, tag interrogation may comprise one or more transaction cycles. For example, in one application, tag 12 can be adapted to provide both ID 18 and data object 20 to reader 14 during a single transaction cycle. Alternatively, tag 12 can be adapted to provide ID 18 during a first transaction cycle, and to provide data object 20, if at all, during a second transaction cycle.

As is known, any of various security procedures may be employed within reader 14 to validate the ID 18 received from tag 12, and within tag 12 to verify that the reader 14 is entitled to receive the data object 20. If necessary, store 16 can be adapted to store any required control or security information. In addition, the integrated circuit of tag 12 may include special-purpose security logic, such as hash table logic and random number generation logic, to control access to data object 20.

As explained in "The Promising but Plodding RFID Industry", Stanford Group Company, 1 Apr. 2008, ("Stanford Paper"), a copy of which is submitted herewith and incorporated herein in its entirety by reference:

"Radio Frequency Identification (RFID) technology promises to be a transformational technology, replacing barcodes and other supply chain management technologies with cheap chip-based tags that can be instantaneously and accurately read from significant distances." [p. 1]

"Radio Frequency Identification ('RFID') technology refers to a wide range of microchip-based systems that can transmit and sometimes receive information via wireless interfaces." [p. 5]

"Ranging from sophisticated government ID cards to simple asset tracking tags, RFID chips are available in a large variety of formats and security configurations, with each 'flavor' of RFID chip tailored specifically for certain applications." [p. 5]

The Stanford Paper discusses a tag as being "applied to or incorporated into a product, animal, or person for the purpose of identification and tracking using radio waves". Far field tags, defined as operating at a distance less than 12 meters from the reader, and near field tags, defined as operating at a distance less than 0.5 meters from the reader may be used. Tags are initially powered down and will wake up upon receipt of a sufficiently strong RF signal. A brief summary of this prior art process is presented on page 7 of the Stanford Paper. The Stanford Paper then went on to note:

"Moreover, at last month's DoD RFID Summit, the Army described its plans to shift away from the data-rich tags that it currently buys . . . and instead migrate to 'license plate tags' that simply contain a unique number which ties to information about a container in a DoD database.

The basic concept is to get away from having information across a distributed network and instead simply use the tags as a pointer to information in a centralized network. The end goal: cheaper tags available from multiple vendors . . . ." [p. 16]

Figure 2:
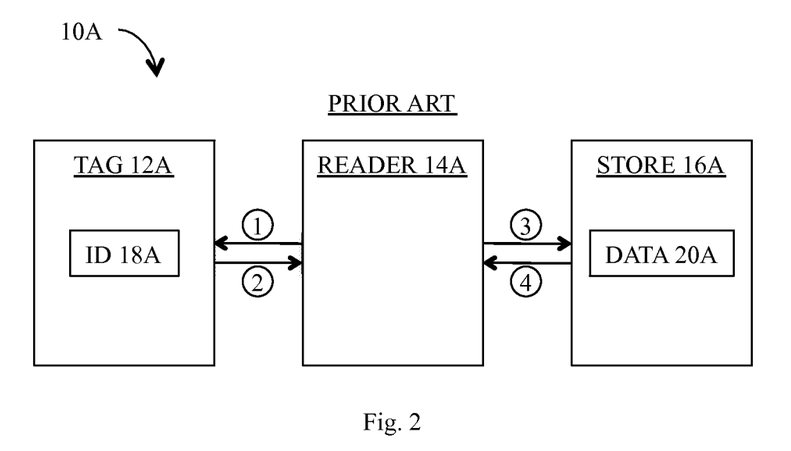
FIG. 2 illustrates in block diagram form, a prior art RFID system, including a tag, a reader, and a store.

As shown in FIG. 2, a prior art RFID system 10A might include a tag 12A, a reader 14A, and a store 16A. During operation, reader 14A, at a minimum, interrogates tag 12A [illustrated in FIG. 2 as transaction 1], and receives ID 18A from tag 12A [transaction 2]. Reader 14A then provides ID 18A to store 16A [transaction 3], and receives data object 20A from store 16A [transaction 4]. As is known, any of various security procedures may be employed within reader 14A to validate the ID 18A stored on tag 12A, and within store 16A to verify that the reader 14A is entitled to receive data object 20A. In this embodiment, tag 12A is dumb, i.e., it stores no data, per se, but simply includes the unique tag ID 18A comprising information sufficient to access data object 20A now stored in store 16A. In a typical commercial application, data object 20A will typically include vendor identification information, product details, pricing and availability, etc. In a distributed network implementation, vendor-provided data object 20A may be stored locally within the reader 14A, i.e., store 16A would be integrated into reader 14A. Alternatively, in a centralized network implementation, vendor-provided data object 20A may be stored at a remote store 16A, typically provided by the vendor or an independent service provider ("ISP"). In both configurations, a public communication network, such as plain old telephone service ("POTS") or the Internet, provides a suitable medium for data distribution. In both types of systems, however, sufficient information is provided by tag 12A to directly access the respective data object 20A.

As is known, objects may be accessed via a Uniform Resource Identifier ("URI"). A URI may comprise a Uniform Resource Locator ("URL"), a Uniform Resource Name ("URN"), or a Uniform Resource Characteristic ("URC"). Each plays a specific role within the URI scheme, namely: (i) URLs are used for locating or finding resources; (ii) URNs are used for identification; and (iii) URCs are used for including meta-information. Although the term typically refers to communication on the World Wide Web ("WWW"), it can also comprise communication over a general network. For example, a URI comprising an International Standard Book Number ("ISBN") number may be used to retrieve a book stored in electronic form in store 16A, or a URL comprising a web link may be used to retrieve a web page stored in electronic form (or dynamically generated) in store 16A.

As is known, prior art RFID systems have several disadvantages. One such disadvantage is that smart tags tend to be relatively expensive and complex, and yet, in general, still have insufficient on-tag storage capacity to accommodate the continuously-increasing data payload. Distributed RFID databases are typically complex, difficult to understand, and time-consuming to maintain. Further, sensitive data is difficult to distribute reliably and difficult to maintain securely at all locations where the data may be stored.

Yet another disadvantage is in the area of security. In general, security issues fall into two basic categories for RFID systems: (i) privacy; and (ii) authentication. Privacy issues include the case of unauthorized readers harvesting information from valid tags. In general, RFID tags silently respond to interrogation by a reader, i.e., without express notification to any party. Often, the unique ID for the tag will comprise manufacturer, product, and serial number information. Thus, without proper security, clandestine scanning of information is a plausible threat. This threat becomes particularly sensitive when personal or proprietary information is included with the RFID tag id, or when the RFID tag id can be readily associated with that information.

Authentication issues can arise when a reader harvests information from counterfeit tags. In general, RFID tags are vulnerable to copy and counterfeit techniques because scanning and replicating tags and tag ids requires relatively little money or expertise. For example, an EPC is a well-defined bit string, easily copied like any other, and simple to emulate via a personal computer ("PC") equipped to transmit the counterfeit codes.

In an attempt to eliminate these and other security threats, much has been done to utilize existing security methods such as passwords defined by the International Organization for Standardization ("ISO"), public key encryption, and other forms of cryptographic security. However, many such techniques add complexity and cost to the RFID tags. Optimally, to enable secure large-scale, item-level tagging, one would want to see the cost of the RFID tag driven down below what it is currently today.

These and related issues are discussed in the Parent Provisional. As a result of these and related problems, RFID technology adoption has been far slower than originally anticipated and desired. We submit that what is needed is a more efficient, reliable, and secure system for linking a tag to a corresponding object.

BRIEF SUMMARY OF THE INVENTION

In accordance with the preferred embodiment of our invention, a radio-frequency identification ("RFID") system comprises a tag, a store, and a reader. The tag contains a tag ID and a tag hidden code. The tag responds to an interrogation by transmitting the tag ID. The tag also responds to receiving a tag control code by computing and transmitting a tag authentication code. The tag authentication code is a function of the received tag control code and the tag hidden code. The store is adapted to store master control codes, master hidden codes, and data, each group of codes and data associated with the unique tag ID received from the tag. The store is adapted to respond to receiving a tag ID by selecting the associated master control code, master hidden code, and data and transmitting the master control code as the associated tag control code. The store is also adapted to respond to the reception of a tag authentication code by computing a corresponding master authentication code, using the selected master control code and master hidden code, and validating that the received tag authentication code corresponds to the master authentication code. If the tag authentication code is successfully validated, the store transmit the corresponding data. The reader is coupled to the tag and to the store and is adapted to interrogate the tag, receive the tag ID from the tag and transmit the tag ID to the store. The reader is also adapted to receive the tag control code from the store and transmit the tag control code to the tag. The reader is also adapted to receive the tag authentication code from the tag and transmit the tag authentication code to the store. Lastly the reader is adapted to receive the data from the store.

BRIEF DESCRIPTION OF THE SEVERAL VIEWS OF THE DRAWINGS

Our invention may be more fully understood by a description of certain preferred embodiments in conjunction with the attached drawings in which.

In the drawings, similar elements will be similarly numbered whenever possible. However, this practice is simply for convenience of reference and to avoid unnecessary proliferation of numbers, and is not intended to imply or suggest that our invention requires identity in either function or structure in the several embodiments.

DETAILED DESCRIPTION OF THE INVENTION

Figure 3:
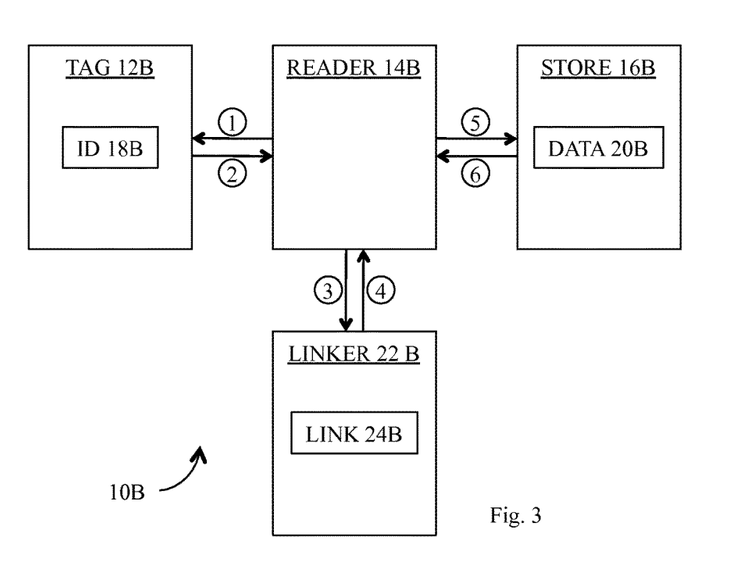
FIG. 3 illustrates in block diagram form, an RFID system constructed in accordance with a preferred embodiment of our invention.

In accordance with the preferred embodiment of our invention as shown in FIG. 3, our RFID system 10B includes tag 12B, reader 14B, store 16B, and a linker 22B. In general, reader 14B is adapted to interrogate tag 12B [illustrated in FIG. 3 as transaction 1], and to receive ID 18B provided by tag 12B [transaction 2] in response to that interrogation. Reader 14B is further adapted to selectively provide ID 18B to linker 22B [transaction 3], and to receive a link 24B from linker 22B [transaction 4]. Finally, reader 14B is adapted to selectively provide the link 24B to store 16B [transaction 5], and to receive a data object 20B from store 16B [transaction 6].

Figure 4:
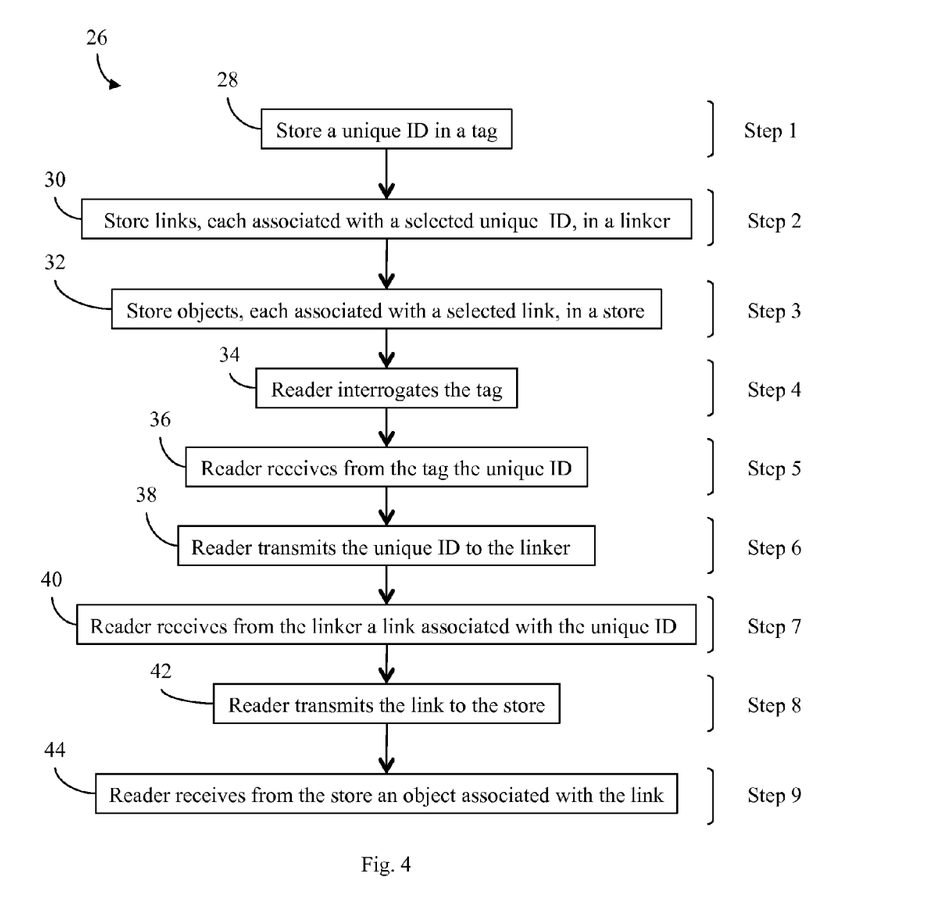
FIG. 4 illustrates in flow diagram form, the sequencing of operations of the RFID system of FIG. 3.

As shown in FIG. 4, our preferred method 26 for linking tag 12B to a data object 20B comprises the following steps:

Step 1: we store a unique ID 18B in tag 12B (step 28).

Step 2: we store links 24B, each associated with a selected unique ID 18B, in linker 22B (step 30).

Step 3: we store data objects 20B, each associated with a selected link 24B, in store 16B (step 32).

Step 4: our reader 14B interrogates tag 12B (step 34).

Step 5: our reader 14B receives from tag 12B the ID 18B (step 36).

Step 6: our reader 14B transmits ID 18B to the linker 22B (step 38).

Step 7: our reader 14B receives from linker 22B the link 24B associated with ID 18B (step 40).

Step 8: our reader 14B transmits link 24B to the store 16B (step 42).

Step 9: our reader 14B receives from the store 16B the data object 20B associated with link 24B (step 44).

In accordance with our invention, linker 22B is adapted to store for each unique ID 18B a corresponding link 24B. During normal operation, linker 22B receives each ID 18B provided by reader 14B, and, if the received ID 18B corresponds to link 24B, linker 22B provides link 24B to reader 14B. Storage of links 24B in linker 22B may be implemented using any of several existing technologies, such as relational databases, associative array structures, lookup tables or the like. As may be desired, linker 22B, including links 24B, may be implemented as either a hardware or software component within reader 14B. Alternatively, linker 22B may be implemented as a stand-alone component either co-located with reader 14B or at a different location remote from reader 14B. For example, in our preferred embodiment, we implement linker 22B as a link server running on a stand-alone computer system and adapted to perform transactions 3 and 4 via the Internet. This configuration is well adapted to our preferred method of system operation in that maintenance of links 24B is relatively centralized with respect to reader 14B (enabling us to easily support multiple readers 14B), thus facilitating rapid posting of changes in links 24B as well as providing, if desired, a secure communication tunnel with both reader 14B and the ultimate source of links 24B (not shown).

Also in accordance with our invention, store 16B is adapted to store for each unique link 24B a corresponding data object 20B. During normal operation, store 16B receives each link 24B provided by reader 14B, and, if the received link 24B corresponds to a data object 20B, store 16B provides data object 20B to reader 14B. Storage of data object 20Bs in store 16B may be implemented using any of several existing technologies, such as relational databases, associative array structures, lookup tables or the like. As may be desired, store 16B, including data objects 20B, may be implemented as either a hardware or software component within reader 14B. Alternatively, store 16B may be implemented as a stand-alone component either co-located with reader 14B or at a different location remote from reader 14B. For example, in our preferred embodiment, we recommend implementing store 16B as a web server running on a stand-alone computer system and adapted to perform transactions 5 and 6 via the Internet. This configuration is well adapted to our preferred method of system operation in that maintenance of data object 20Bs is relatively centralized with respect to reader 14B (enabling us to easily support multiple readers 14B), thus facilitating rapid posting of changes in data object 20Bs as well as providing, if desired, a secure communication tunnel with both reader 14B and the ultimate source of data objects 20B (not shown).

In accordance with our invention, we are able to provide the controllability and data coherence benefits of prior art centralized systems while simultaneously providing the flexibility and timeliness of prior art distributed systems. In contrast to prior art distributed data systems, in our preferred embodiment, only links 24B need to be distributed, where they may be maintained in linker 22B in a relatively simple, easily understood and maintained database structure. In contrast to prior art centralized data systems, in our preferred embodiment, relocation or reorganization of data objects 20B does not require modification of the corresponding ID 18B stored in tags 12B, but, rather, only the impacted links 24B. Also, our distributed-link, centralized-data organization is especially well suited to take advantage of the inherent benefits of the now-ubiquitous Internet.

Hidden Code Security

Figure 5:
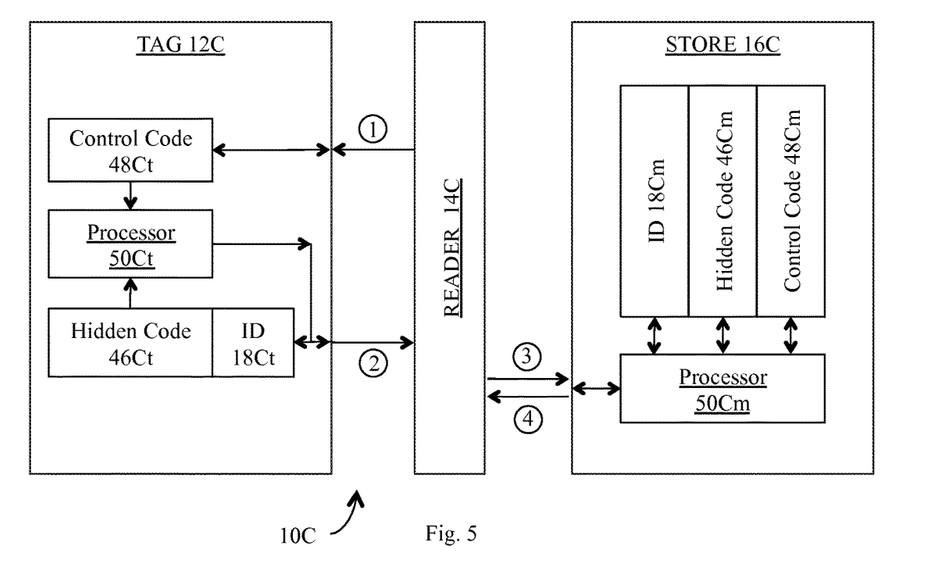
FIG. 5 illustrates in block diagram form, an RFID authentication system constructed in accordance with a preferred embodiment of our invention.

In accordance with our invention, the security issues described above are addressed by our system 10C illustrated in FIG. 5. In general, our system 10C is comprised of RFID tag 12C, reader 14C and store 16C. In the illustrated embodiment, tag 12C is adapted to store a unique tag ID 18Ct, a tag hidden code 46Ct and tag control codes 48Ct. In addition, tag 12C includes a tag processor 50Ct adapted to selectively develop a tag authentication code from the tag hidden code 46Ct as determined by the tag control codes 48Ct. Also, as illustrated, store 16C is adapted to store a unique master ID 18Cm, a master hidden code 46Cm and master control codes 48Cm. In addition, store 16C includes a master processor 50Cm adapted to selectively develop a master authentication code from the master hidden code 46Cm as determined by the master control codes 48Cm.

In one embodiment, reader 14C is adapted to selectively interrogate tag 12C using, e.g., a singulation command [illustrated in FIG. 5 as transaction 1]. In response, tag 12C provides to reader 14C a tag identification sequence comprising the concatenation of the tag ID 18Ct and the tag authentication code [transaction 2], which reader 14C then forwards to store 16C [transaction 3]. Preferably, while the reader 14C is interrogating the tag 12C, store 16C is developing a master identification sequence comprising the master ID 18Cm and the master authentication code. Upon receipt, store 16C compares the tag identification sequence with the master identification sequence and then provides to reader 14C a validation signal that indicates either that tag 12C has been authenticated or not [transaction 4]. Optionally, in the event that the tag 12C cannot be authenticated, reader 14C and store 16C may selectively vary tag control codes 48Ct in an attempt to determine the cause of the failure of authentication or to implement an alternate or supplemental authentication process.

In one other embodiment, tag 12C may be adapted to provide only the tag ID 18Ct in response to the singulation sequence. In response to receiving ID 18Ct, reader 14C may thereafter selectively request tag 12C to develop and provide the tag authentication code. Upon receipt, reader 14C may then forward to the store 16C both the ID 18Ct and the tag authentication code for authentication as discussed above. Optionally, the store 16C may be adapted to provide the master authentication code in response to receiving the ID 18Ct, so that the reader 14C may itself perform the authentication.

Figure 6:
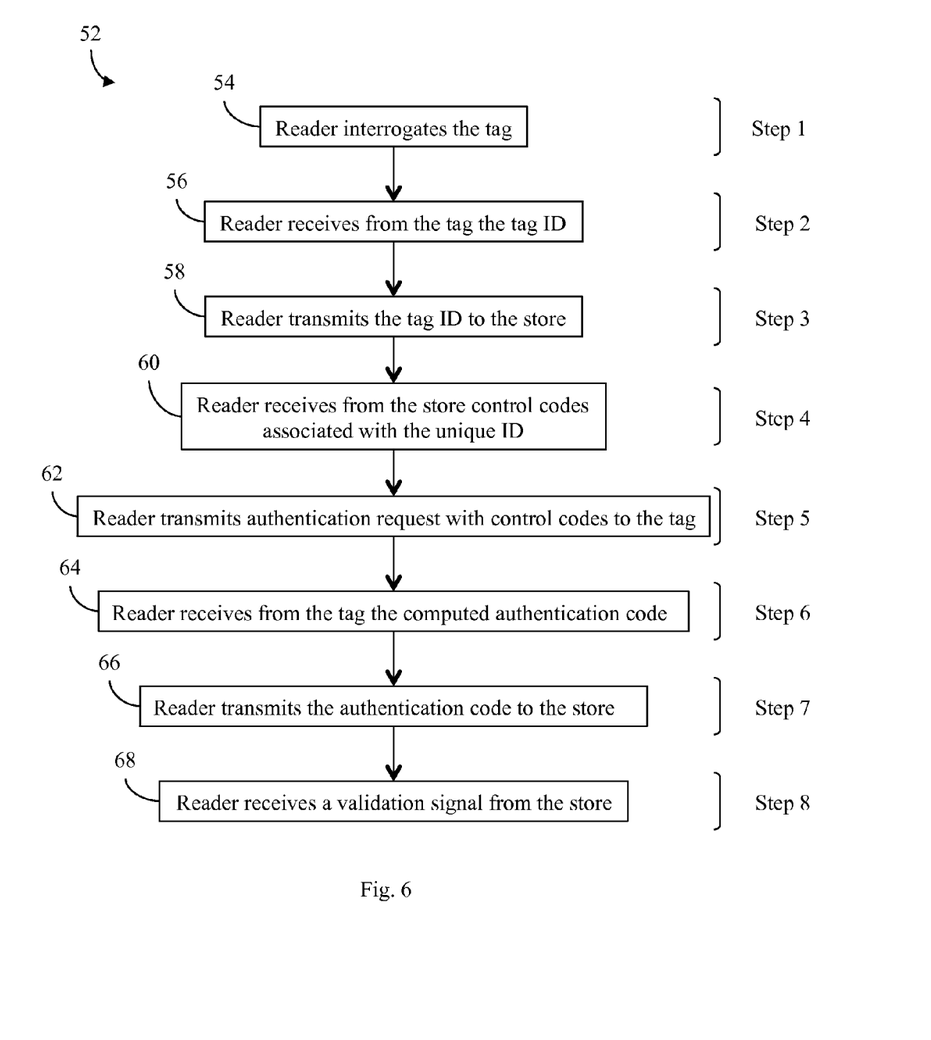
FIG. 6 illustrates in flow diagram form, a process utilized by our RFID authentication system shown in FIG. 5.

As shown in FIG. 6, one other method 52 for implementing hidden code security comprises the steps of:

Step 1: our reader 14C interrogates the tag 12C (step 54).

Step 2: our reader 14C receives from tag 12C the tag ID 18Ct (step 56).

Step 3: our reader 14C transmits the tag ID 18Ct to the store 16C (step 58).

Step 4: our reader 14C receives from store 16C control codes 48Cm associated with tag ID 18Cm (step 60).

Step 5: our reader 14C transmits control codes 48Cm to the tag 12C as part of the authentication request (step 62).

Step 6: our reader 14C receives from the tag 12C the computed authentication code (step 64).

Step 7: our reader 14C transmits the authentication code to the store 16C (step 66).

Step 8: our reader 14C receives from the store 16C a validation signal (step 68).

Figure 7:
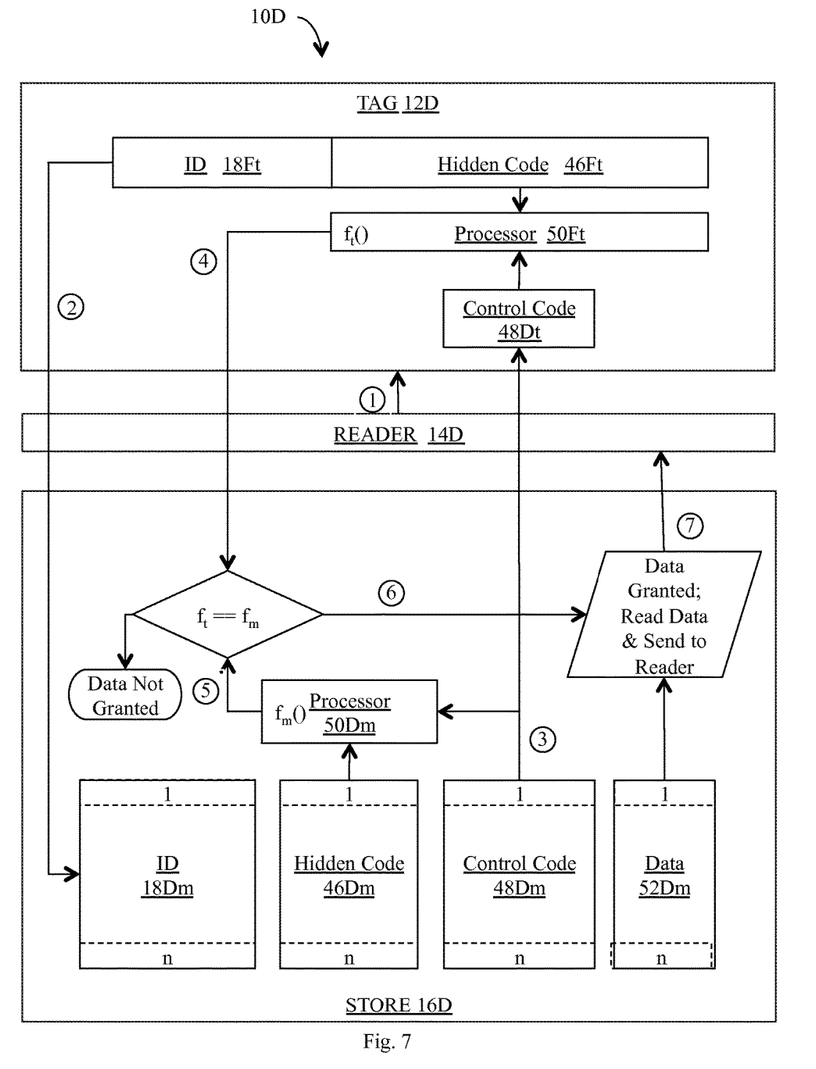
FIG. 7 illustrates in block diagram form, an alternate embodiment of the RFID system shown in FIG. 5.

In one other embodiment, illustrated in FIG. 7, the system operates similarly to the embodiment illustrated in FIG. 5. Again, the reader 14D is adapted to selectively interrogate tag 12D using a singulation command [transaction 1]. In response, tag 12D provides to reader 14D the tag ID 18Dt, which reader 14D then transmits to store 16D [transaction 2]. Using the received tag ID 18Dt, store 16D retrieves an associated control code 48Dm for transmission back to tag 12D via reader 14D [transaction 3]. Upon receipt of the control code, tag 12D uses processor 50Dt to develop a tag authentication code as a function of the received control code 48Dt and the tag hidden code 46Dt, for transmission back to store 16D via reader 14D [transaction 4]. Substantially independently, store 16D uses processor 50Dm to develop a master authentication code as a function of the master control code 48Dm and a master hidden code 46Dm associated with the received tag ID 18Dt [transaction 5]. If the received tag authentication code compares favorably to the internally developed master authentication code [transaction 6], store 16D retrieves a data 52D associated with the received tag ID 18Dt for transmission to the reader 14D for further processing [transaction 7]. Optionally, in the event that tag 12D cannot be authenticated, reader 14D and store 16D may selectively vary tag control codes 48Dt in an attempt to determine the cause of the validation failure.

Figure 8:
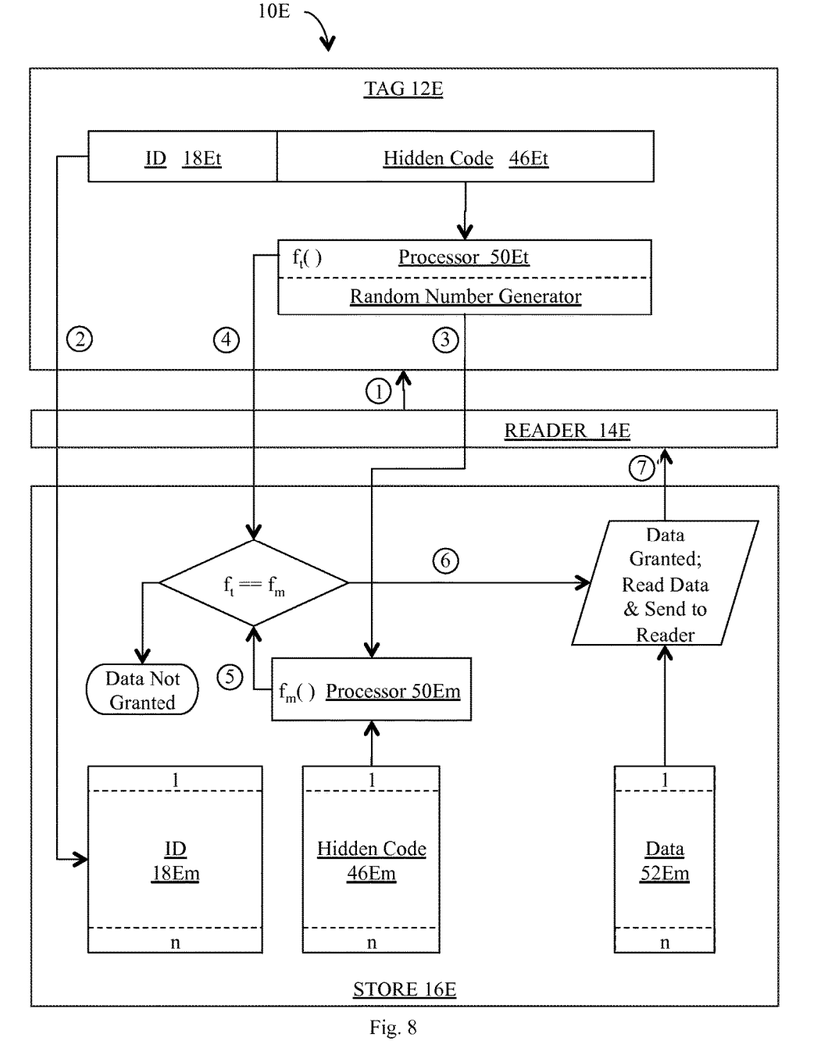
FIG. 8 illustrates in block diagram form, another alternate embodiment of the RFID system shown in FIG. 5.

In one other embodiment, illustrated in FIG. 8, the system operates similarly to the embodiment illustrated in FIG. 7. Again, the reader 14E is adapted to selectively interrogate tag 12E using a singulation command [transaction 1]. In response, tag 12E provides the tag ID 18Et to store 16E via reader 14E [transaction 2]. Within tag 12E, tag processor 50Et first generates a random number and then develops a tag authentication code as a function, $f_t(\ )$, of that random number and the tag hidden code 46Et. Preferably, as each is developed, tag 12E transmits both the random number and the tag authentication code to store 16E via reader 14E [transactions 3 and 4, respectively]. Within store 16E, store processor 50Em develops a master authentication code as a function, $f_m(\ )$, of the received random number and a master hidden code 46Em associated with the received tag ID 18Et [transaction 5]. If the received tag authentication code compares favorably to the internally developed master authentication code [transaction 6], store 16E transmits a data 52Em associated with the received tag ID 18Et to the reader 14E for further processing [transaction 7]. Optionally, in the event that tag 12E cannot be authenticated, reader 14E and store 16E may selectively repeat this sequence in an attempt to determine the cause of the validation failure, each time using a new random number generated by tag processor 50Et. If desired, tag processor 50Et may be adapted to implement the function, $f_t(\ )$ in a bit-serial manner, thus enabling, in some embodiments, both the random number and tag authentication code to be transmitted substantially simultaneously to store 16E using a suitable bit-serial transmission protocol.

Figure 9:
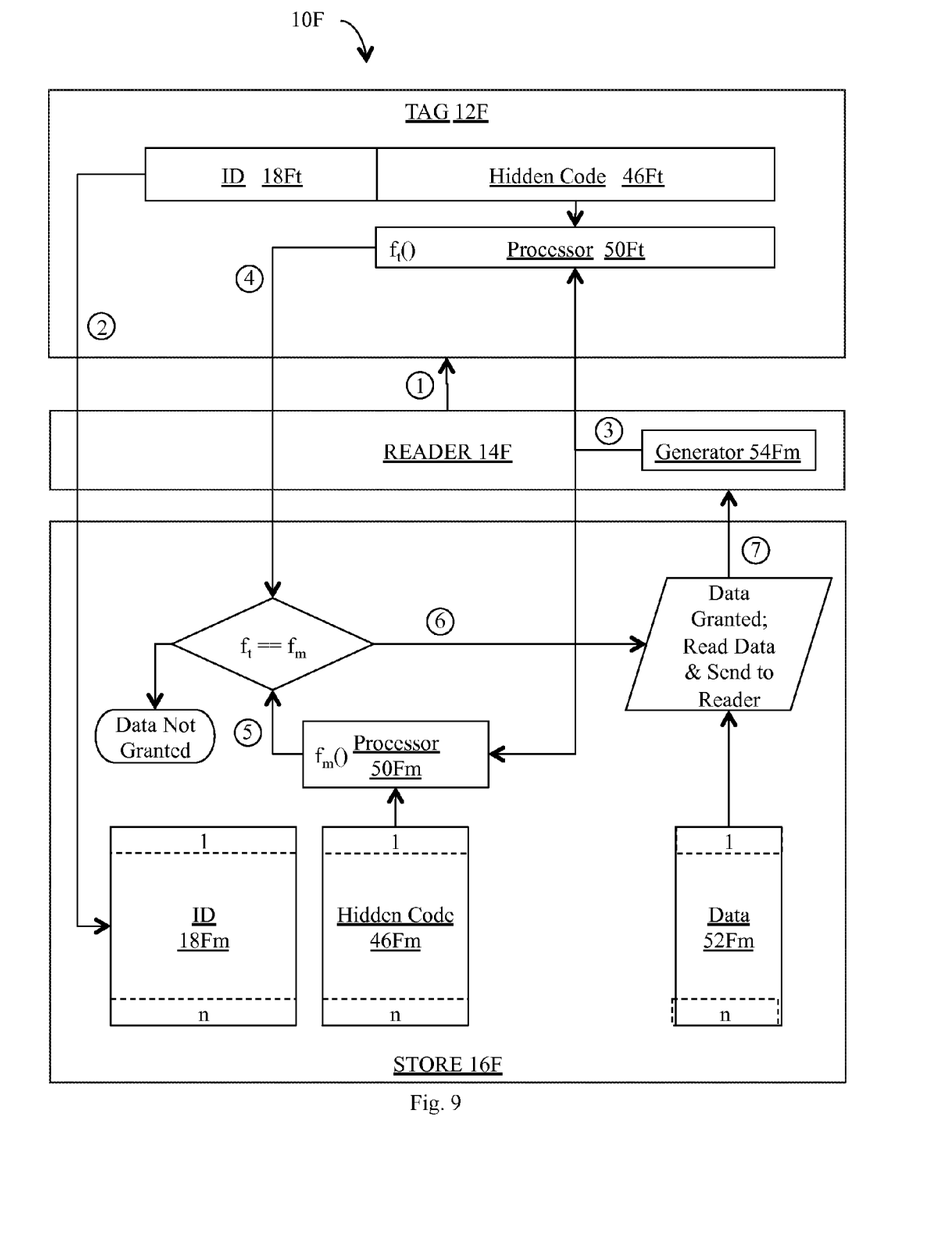
FIG. 9 illustrates in block diagram form, yet another alternate embodiment of the RFID system shown in FIG. 5.

In yet another embodiment, illustrated in FIG. 9, the system operates similarly to the embodiments illustrated in FIGS. 7 and 8. However, in this embodiment, rather than storing a plurality of master control codes, reader 14F includes a generator 54Fm adapted to selectively generate a substantially random number. As in FIGS. 7 and 8, the reader 14F is adapted to selectively interrogate tag 12F using a singulation command [transaction 1]. In response, tag 12F provides the tag ID 18Ft to store 16F via reader 14F [transaction 2]. In one embodiment, in response to receiving the tag ID 18Ft, reader 14F transmits the random number to both the processor 50Ft and the store 16F [transaction 3]; alternatively, reader 14F may transmit the random number substantially coincident with the singulation command. In response to receiving the random number, tag processor 50Ft develops the tag authentication code as a function, $f_t(\ )$ of the tag hidden code 46Ft and the received random number, for transmission to the store 16F via reader 14F [transaction 4]. In response to receiving both the tag ID 18Ft and the generated random number, store processor 50Fm develops a master authentication code as a function, $f_m(\ )$ of the random number and a master hidden code 46Fm associated with the received tag ID 18Ft [transaction 5]. If the received tag authentication code compares favorably to the developed master authentication code [transaction 6], store 16F transmits a data 52Fm associated with the received tag ID 18Ft to the reader 14F for further processing [transaction 7]. Optionally, in the event that tag 12F cannot be authenticated, reader 14F and store 16F may selectively repeat this sequence in an attempt to determine the cause of the validation failure, each time using a new random number generated by generator 54Fm. If desired, tag processor 50Ft may be adapted to implement the function, $f_r()$ in a bit-serial manner, thus enabling, in some embodiments, both the incoming random number and the outgoing tag authentication code to be transmitted using a suitable bit-serial transmission protocol.

In accordance with our invention, tag ID 18xt may be a unique proprietary ID that does not contain any company or product specific information. (Note: for convenience of reference hereinafter, we will use the generic place-holder, "x", to indicate any of the several embodiments A-E disclosed above and variants thereof.) Tag ID 18xt, as well as the tag hidden code 46xt may be initially registered at production, and may be programmed into a non-volatile form of memory, or allowed to randomly initialize based upon some processing variation and biases; either way, the value are unique at registration. This lack of specific intelligence on the tag is of particular importance when addressing privacy issues. Using a tag ID 18xt that lacks any specific information addresses the aforementioned privacy issue by securely storing vendor information, product serial codes, stock keeping unit ("SKU") information or the like elsewhere, preferably in the store 16x where it can be quickly accessed using the unique tag ID 18xt as an index. In an alternate embodiment, tag ID 18xt may be a unique 96-bit EPC tag ID. Although the tag control code 48x has been described above as being purely static, our invention will accommodate other forms, including, for example, a tag control code comprising a first, fixed portion and a second, substantially random portion. The tag hidden code 46xt is stored so as to be inaccessible through normal commands, e.g., via a standard singulation command. Rather, the tag hidden code 46xt can only be read from the tag 12x after modification, encryption or scrambling by tag processor 50xt in accordance with the control codes 48xt.

In one embodiment, our tag processor 50xt includes, in addition to appropriate timing and control logic, a linear feedback shift register ("LFSR") with programmable feedback logic. In general, a LFSR coefficients portion of control codes 48xt controls the programmable feedback logic so as to define the polynomial implemented by the LFSR. Preferably, a LFSR seed portion of control codes 48xt contain a multi-bit seed by which the LFSR is initialized. In an alternate implementation, tag hidden code 46xt may itself act as the initial seed for the LFSR, while the LFSR coefficients portion of the tag control code 48xt defines only the polynomial implemented by the LFSR. In yet another embodiment, a seed select portion of control codes 48xt may select one of a plurality of sources of the LFSR seed. Typically, the several bits of the LFSR will first be initialized using the selected seed, and the feedback logic configured using the LFSR coefficients portion of control codes 48xt. In response to an authentication request, the tag processor 50xt will compute the authentication code by scrambling the hidden code 46xt using the cyclical output pattern generated by the LFSR. This authentication code is forwarded, together with tag ID 18xt, to the reader 14x which then transmits the same to the store 16x. In one embodiment, the LFSR coefficients portion of control code 48xt define a polynomial function in the following general form:

$$f(h)=a+bh^c+dh^e+fh^g \qquad [\text{Eq. 1}]$$

where:
h=seed bits
a, b, c, d, e, f, g=coefficients

As will be understood, the resulting transfer function will be of the general form:

$$f(x)=x*f(h) \qquad [\text{Eq. 2}]$$

Using the embodiment illustrated in FIG. 5 by way of example, store 16C is adapted to store a master ID 18Cm corresponding to tag ID 18Ct, a master hidden code 46Cm corresponding to tag hidden code 46Ct and a master control code 48Cm corresponding tag control code 48Ct. During authentication, store 16C uses master processor 50Cm to compute a master version of the authentication code for validating the authentication code received from the tag 12C. In normal operation, the tag hidden code 46Ct is inaccessible via any other means after scrambling by the tag processor 50Ct. Preferably, a special transfer command sequence is implemented in tag 12C and reader 14C whereby the tag processor 50Ct is placed in a transfer mode of the form:

$$f(x)=x \qquad [\text{Eq. 3}]$$

thus passing the hidden code 50Ct without scrambling or other modification. In one embodiment, this sequence may consist of the reader 14C selectively storing into tag 12C a new tag control code 48Ct specially adapted to implement the desired transfer function. As will be clear, the specific control code 48Ct is dependent on the design of tag processor 50Ct and its internal configuration.

In accordance with our invention, the cyclical nature of the LFSR output assures that the authentication code broadcast by tag 12C will be different for each successive authentication cycle. Indeed, careful design of the tag processor 50Ct and judicious selection of the control code 48Cx can provide operational variation very nearly resembling random generation. As a further deterrent, our method facilitates frequent changes to the control code 48Cx. Without knowledge of the hidden code 46Cx and the current control code 48Cx, and without knowing the specific configuration of the tag processor 50Ct, creating a clone of tag 12C that will reliably pass authentication becomes quite difficult.

As will also be evident to those skilled in the art, other embodiments of the function f(x) are possible. Of particular interest are functions which are computationally intensive to invert or which are intrinsically non-invertible, such as hash tables (see, e.g., Ahson, et. al, *RFID Handbook: Applications, Technology, Security, and Privacy*, CRC Press, Boca Raton, Fla., USA, 2008, p. 490) or chaotic delta-sigma modulators (see, e.g., Freely, "Nonlinear Dynamics of Chaotic Double-Loop Sigma Delta Modulation", IEEE International Symposium on Circuits and Systems, 1994, pp. 101-104) (which utilize nested, non-linear feedback). Using chaotic delta-sigma modulators, some portion of the hidden code bits and the control code bits can be used as the initial state variables while the remaining bits are used as the input sequence to the modulator for a prescribed number of modulator cycles.

As will be evident to those skilled in the art, our improved security techniques may be practiced in the prior art systems depicted in FIG. 1 and FIG. 2, as well as in our RFID systems 10B-F depicted in FIGS. 3, 5, 7 and 8, respectively. As is known, each of the illustrated embodiments will typically include additional conventional components such as a display and a keyboard for interacting with the system 10*x*, and, as appropriate, a router or the like to enable connectivity between the reader 14*x* and the store 16*x*. Additionally, those skilled in the art will recognize that the master processor 50*x* is not limited to its location in the store 16*x*, but may also be incorporated into the reader 14*x*, or in some other location that allows it to interact with store 16*x* and the remainder of the components within the system 10*x*. In an alternate embodiment, store 16*x*, including all of the various components described above, may be completely incorporated into the reader 14*x*.

Other embodiments of our invention include, at a minimum, various types of tags. For example, tags may include active RFID tags, which typically include a battery, and passive RFID tags, which may have no battery or may be assisted by a battery. Our invention also includes tags with various read range capabilities.

Other embodiments of our invention include, at a minimum, various types of readers that have the capability to manage data and to communicate with tags and databases. For example, reader-enabled devices may include mobile phones, internet enabled phones, computers, smart phones, and Personal Digital Assistants ("PDAs").

Other embodiments of our invention include, at a minimum, various types of linkers. For example, our linker may include an object-oriented database.

Thus it is apparent that we have provided a method and apparatus for a reduced complexity RFID system including a simple tag, a reader, a linker, and a store, each adapted to cooperate to link a tag to a corresponding object. Those skilled in the art will recognize that modifications and variations can be made without departing from the spirit of our invention. For example, functionality of the RFID system may be implemented in software or hardware or a combination of both. In general, what we have referred to as a "unique ID" may also be referred to by using related terminology including an ID, a code, a unique ID, a unique code, a tag ID, a tag code, a unique tag ID, a unique tag code, or the like. Although the control code 48*x* has been described above as being purely static, our invention will accommodate other forms, including, for example, a control code comprising a first, fixed portion and a second, substantially random portion. Our linker may also be referred to by using related terminology including a linking unit, a link store, or the like. What we prefer to call a "link" may also be referred to by using related terminology including a link ID, a URI, a URL, a URN, a URC, an ISBN, or the like. Our preferred database may also be referred to by using related terminology including a data store, a data unit, a database management system, or the like. The act of interrogating the tag may also be described by using related terminology such as transmitting a request to the tag, reading the tag, or the like. When our reader interrogates the tag or transmits a request to the tag, the data transmitted from the tag back to the reader may include the unique ID stored in the tag, other control or security information, validation challenges, and the like. In general, our data object may be described by using related terminology such as just data, a data unit, a data packet, a data payload, or the like. Therefore, we intend that our invention encompass all such variations and modifications as fall within the scope of the appended claims.

What we claim is:

1. In a radio frequency identification ("RFID") system, a method comprises:
    receiving, by a reader of the RFID system, a tag identifier (ID) from a tag of the RFID system;
    authenticating the tag ID by: performing a function on one or more tag hidden codes to produce a tag authentication code;
    performing a corresponding function on one or more master codes to produce a master authentication code;
    comparing the tag authentication code with the master authentication code; and
    when the tag authentication code substantially matches the master authentication code, indicating that the tag ID is valid; and
    receiving by the reader, a link from a linker when the tag ID is valid, wherein the linker stores a plurality of links, which includes the link, and wherein the linker affiliates the link to the tag ID;
    sending, by the reader, the link to a store of the RFID system; and
    receiving, by the reader, data regarding an object affiliated with the link from the store.

2. The method of claim 1 wherein the tag ID comprises one of:
    a binary bit string; and
    an electronic product code (EPC) code.

3. The method of claim 1 wherein the receiving comprises:
    sending, by the reader, an interrogation to the tag; and
    receiving, in response to the interrogation, the tag ID from the tag.

4. The method of claim 1 further comprises:
    performing the function by the tag;
    performing the corresponding function by at least one of: the reader, the linker, and the store; and
    performing the comparing by at least one of: the reader, the linker, and the store.

5. The method of claim 1, wherein receiving the link comprises:
    sending, by the reader, the tag ID to the linker;
    indexing, by the linker, the plurality of links based on the tag ID to identify the link; and
    sending, by the linker, the link to the reader.

6. The method of claim 1, wherein receiving the data comprises:
    sending, by the reader, the link to the store;
    indexing, by the store, a plurality of data based on the link to identify the data; and
    sending, by the store, the data to the reader.

7. The method of claim 1, wherein the data comprises one or more of:
    product manufacture name;
    tag information;
    product information; and
    pricing information.

8. The method of claim 1 further comprises:
    receiving, by the reader, a second tag ID from a second tag of the RFID system;
    receiving, by the reader, a second link from the linker when the second tag ID is valid, wherein the plurality of links includes the second link and wherein the linker affiliates the second link to the second tag ID;
    sending, by the reader, the second link to the store; and
    receiving, by the reader, second data regarding a second object affiliated with the second link from the store.

9. The method of claim 1 further comprises:
    receiving, by a second reader of the RFID system, a second tag ID from a second tag of the RFID system;
    receiving, by the second reader, a second link from the linker when the second tag ID is valid, wherein the plurality of links includes the second link and wherein the linker affiliates the second link to the second tag ID;

sending, by the second reader, the second link to the store; and receiving, by the second reader, second data regarding a second object affiliated with the second link from the store.

* * * * *